United States Patent [19]

Chillarege et al.

[11] Patent Number: 5,193,178
[45] Date of Patent: Mar. 9, 1993

[54] SELF-TESTING PROBE SYSTEM TO REVEAL SOFTWARE ERRORS

[75] Inventors: Ram Chillarege, Peekskill; Philip L. Rosenfeld, Pleasantville, both of N.Y.

[73] Assignee: International Business Machines Corporation, Armonk, N.Y.

[21] Appl. No.: 606,644

[22] Filed: Oct. 31, 1990

[51] Int. Cl.$^5$ ............................................. G06F 11/00
[52] U.S. Cl. ...................................... 395/575; 371/19
[58] Field of Search .................... 395/575; 371/3, 19, 371/20.1, 25.1

[56] References Cited

U.S. PATENT DOCUMENTS 4,617,663 10/1986 Lake et al. ............................. 371/19

OTHER PUBLICATIONS

*Digital Logic and Computer Design* by M. Morris Mano, Prentice-Hall, Inc. ©1979, pp. 528–530.

*Primary Examiner*—Vincent P. Canney
*Attorney, Agent, or Firm*—Whitham & Marhoefer

[57] ABSTRACT

A probe mechanism detects failed software components in a running software system. The probe mechanism is based on requesting service, or a certain level of service, from a set of functions, modules and/or subsystems and checking the response to the request. The probe is directed towards a service rendered by a collection of software modules and functions which is termed a target. The probe will then label a target as either healthy or failed. The objective is to localize the failure only up to the level of a target, however, and achieve a high degree of efficiency and confidence in the process. Targets are chosen such that they represent a collection of functions that can be defined by a service level input-/output (I/O) specification. Targets can be identified at different levels or layers in the software. The choice of a level is based on the granularity of fault detection that is desired, taken in consideration with the level at which recovery can be implemented. To further enhance the operation of the probe, it is made self testing against any single failure in its operational components. The technique to make the probe self testing uses the probe paradigm to define a null probe which tests the probe dispatcher and creates a null failure which in turn tests the probe analyzer. The probe mechanism may be implemented on either a signle or multiple computer system.

14 Claims, 10 Drawing Sheets

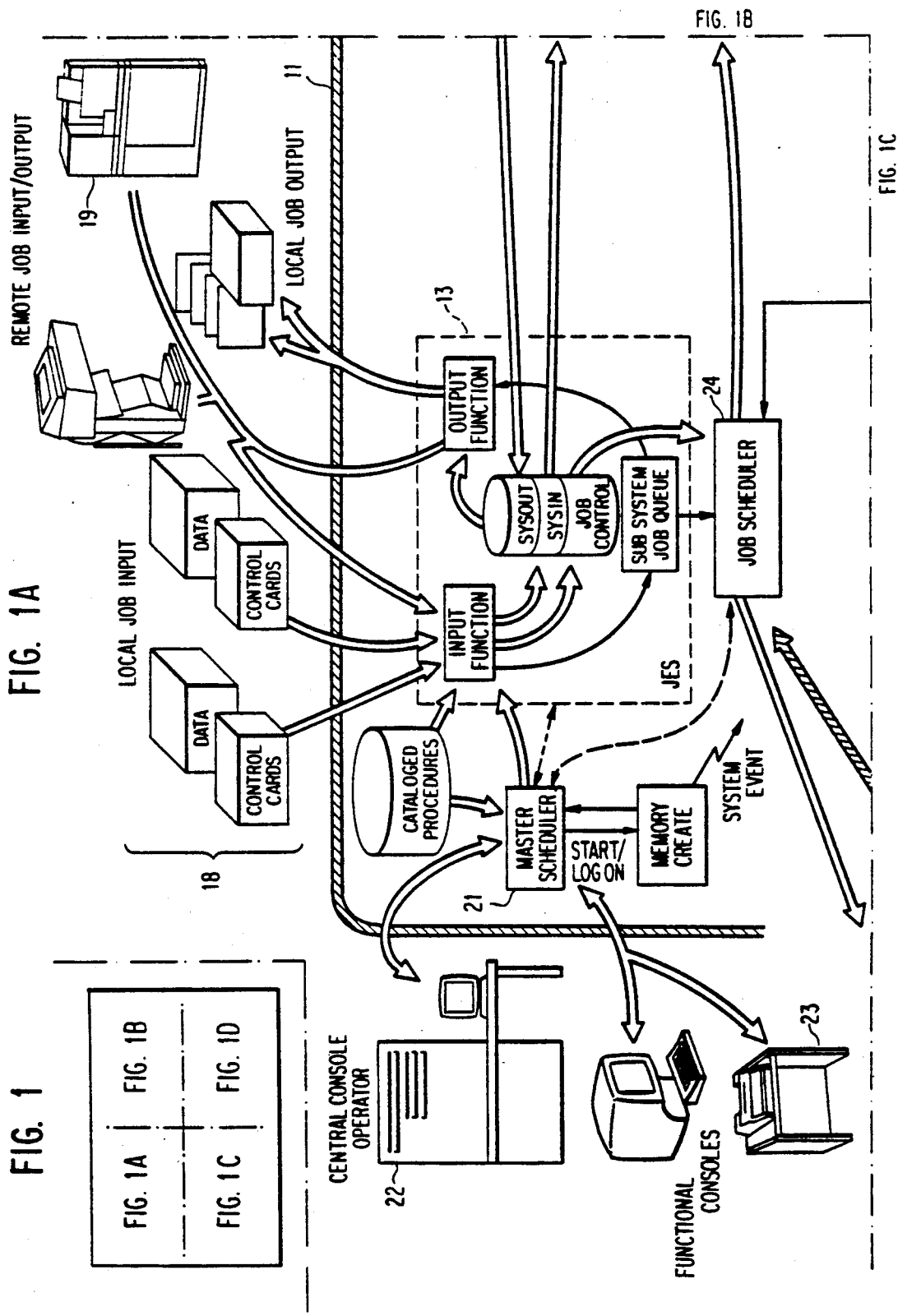

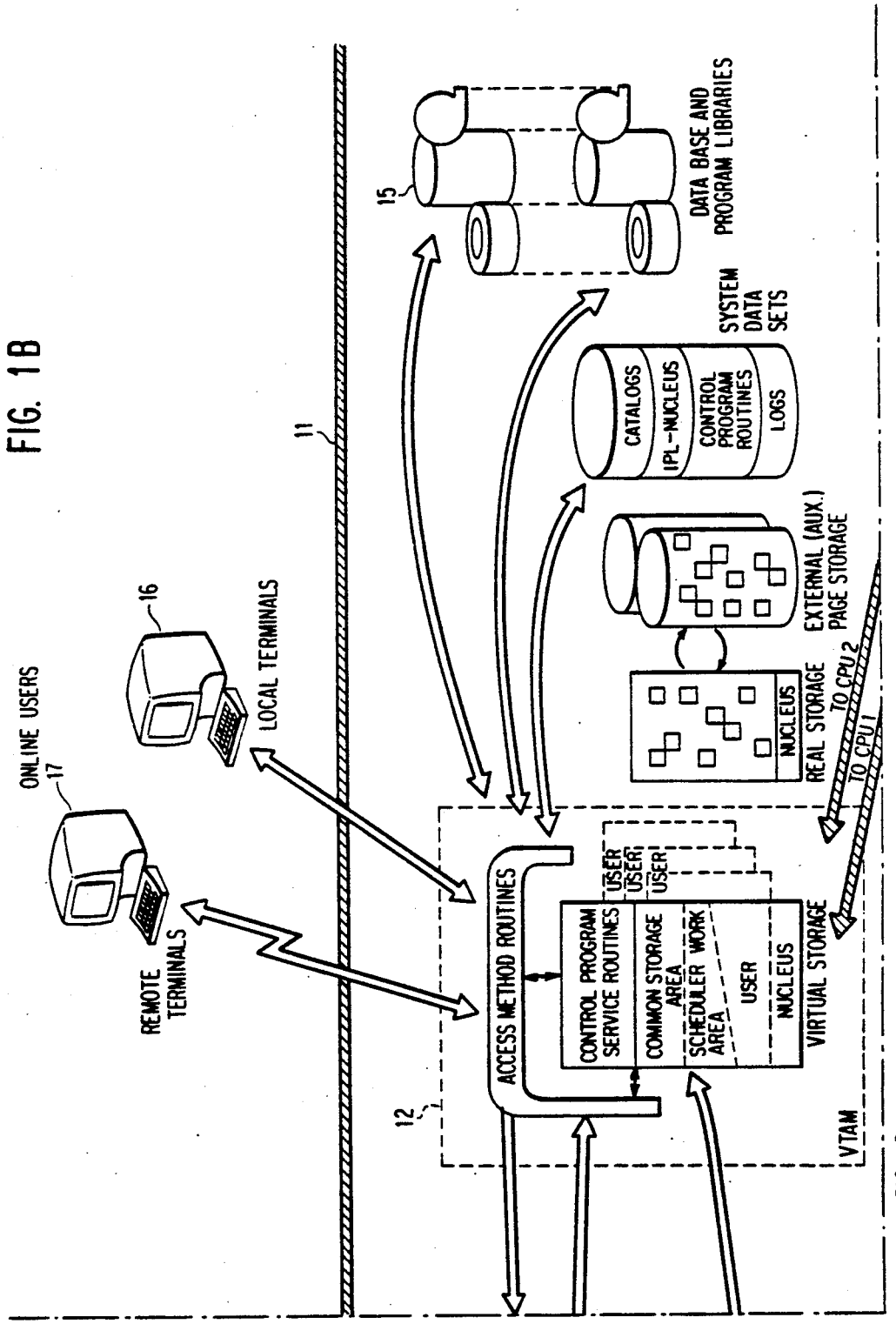

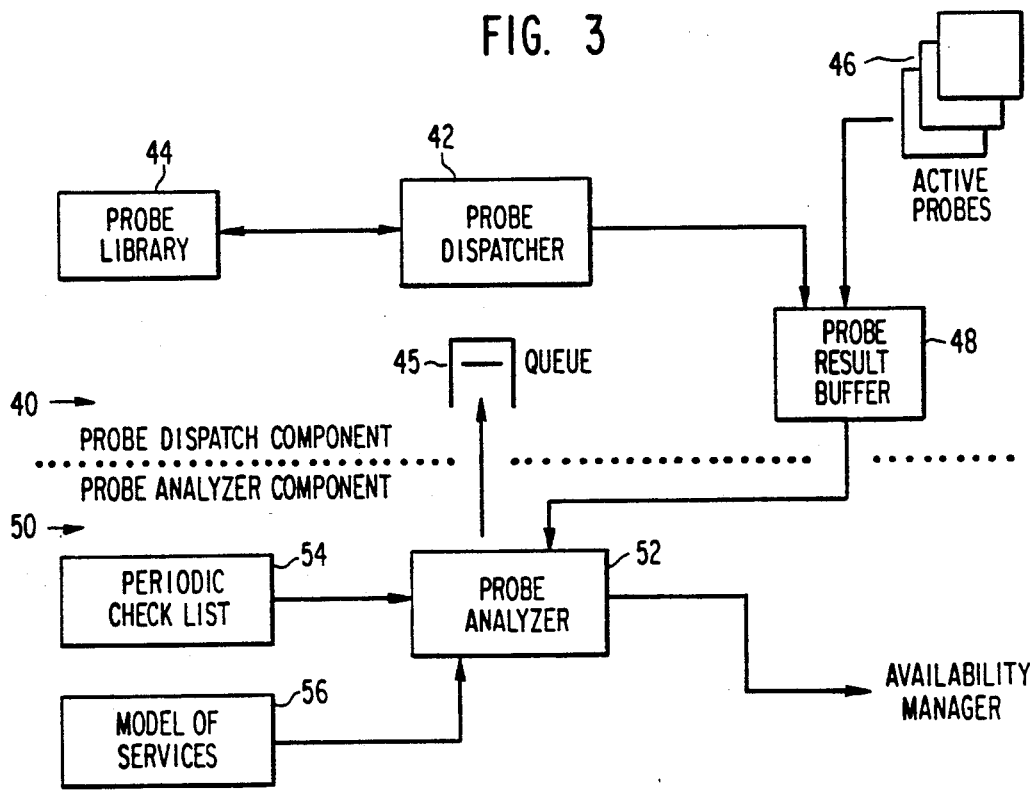

LEVEL OF PERIODIC CHECKS

TYPICAL HIERARCHY OF SOFTWARE MODULES

CHANNEL TO CHANNEL COMMUNICATION

| | ENTRY BY DISPATCHER | | | ENTRY BY PRB | | ENTRY BY DISP | | SYSTEM ID |
|---|---|---|---|---|---|---|---|---|
| PROBE ID | SEQ. NO. | TIME | MAX TM | STATUS | TIME | LOST? | TIME | |
| PRB 8 | 001 | 00.01 | 00.45 | HEALTHY | 00.23 | | | |
| PRB 2 | 002 | 01.00 | 00.45 | HEALTHY | 01.27 | | | |
| PRB 6 | 003 | 01.22 | 00.30 | HEALTHY | 01.35 | | | |
| PRB 8 | 004 | 01.57 | 00.45 | FAILED | 02.25 | | | 5 |
| PRB 6 | 005 | 02.30 | 00.20 | | | LOST | 3.00 | |
| PRB 8 | 006 | 03.45 | 00.45 | HEALTHY | 03.87 | | | |
| NULL PRB | 007 | 04.15 | 00.45 | | | LOST | 4.80 | |

SELF-TESTING PROBE SYSTEM TO REVEAL SOFTWARE ERRORS

BACKGROUND OF THE INVENTION

1. Field of the Invention

The present invention generally relates to computer software testing and, more particularly, to a run time self-testing probe that provides a mechanism to detect and reveal failed software modules and assist in system recovery. The invention has applications in both single system and multi-system environments.

2. Description of the Prior Art

Software failure has continued to be a major concern in system reliability as it can cause loss of availability in either the entire system or specific subsystems. However, if these failures are restricted to a subset of the system, it is possible for certain services to remain available while others are not. If the failure of subsystems, services and/or modules is detected promptly, the overall availability of the system can be improved via takeover, workload distribution or other recovery mechanisms. Detection of failed components of the system is an essential part of designing systems for high availability, and early detection can limit the damage done to other parts of the system by decreasing the propagation of errors.

Software diagnostic systems are known in the prior art. For example, U.S. Pat. No. 4,595,981 to Leung discloses a method for the automatic testing of large, incrementally developed programs. This method monitors variables passed between modules and compares them to specified inputs. Program execution is suspended at a point where one module calls another to effect verification of input values. Thus, the Leung method is not intended for run time failure detection.

Brian Randell in "System Structure for Software Fault Tolerance", *IEEE Trans. on Software Engineering*, Vol. SE-1, No. 2, June 1975, pp. 220-232, discusses acceptance tests that detect software errors within a recovery block. Acceptance tests are local to the part of a program within the module that pertains to local variables and logic. The acceptance test does not capture system level service information that is necessary to identify software faults of the type that occur in the field. Furthermore, field faults are often caused by the interactions of multiple modules and timing problems that occur at increased workloads that the acceptance test is not designed to identify and isolate.

What is needed is a way to detect software failures, some of which may be incipient or hidden, with no interruption to program execution. In other words, a technique needs to be provided which will continually monitor a software system comprising many components as in a large mainframe system. These components run asynchronously and failures in this type of software are known to have large latencies. Ram Chillarege and Ravishankar K. Iyer, in "Measurement-Based Analysis of Error Latency", *IEEE Transactions on Computers*, Vol. C-36, No. 5, May 1987, pp. 529-537, have reported that their measurements have revealed latencies ranging from a few hours to a few days. Furthermore, these latent errors are known to surface with changes in workload such as those that occur between batch and on-line transaction processing as reported by Ravishankar K. Iyer, Steven E. Butner and Edward J. McCluskey in "A Statistical Failure/Load Relationship: Results of a Multicomputer Study", *IEEE Transactions on Computers*, Vol. C-31, No. 7, July 1982, pp. 697-706. Ram Chillarege and Nicholas S. Bowen in "Understanding Large System Failures—A Fault Injection Experiment", *Dig. 19th Int. Symp. on Fault Tolerant Comp.*, June 1989, pp. 356-363, describe the use of fault injection to understand failure characteristics of a large system. This paper reports the discovery of errors termed "potential hazards" that remain dormant (latent) until a major shift in the work load occurs. These errors are likely to cause the work load dependant failures reported in the literature.

SUMMARY OF THE INVENTION

It is therefore an object of the present invention to provide a mechanism to detect and reveal failed software modules and assist in system recovery in the event of a failure.

It is another object of the invention to provide a probe which not only will detect software failures, but is also self-testing to detect any failures in the probe itself.

It is a further object of the invention to provide a probe mechanism to detect and reveal failed software modules in a multi-system environment.

According to the invention, a mechanism is provided to detect failed software components in a working system. It is based on requesting service, or a change in the level of service, from a set of functions, modules and/or subsystems and checking the response to the request. This mechanism, herein referred to as a probe, is directed towards a service rendered by a collection of software modules and functions, which is termed a target. The probe will then label a target as either healthy or failed. The objective here is to localize the failure only up to the level of a target, however, and achieve a high degree of efficiency and confidence in the process. Targets are chosen such that they represent a collection of functions that can be defined by a service level input/output (I/0) specification. Clearly, targets can be identified at different levels or layers in the software The choice of a level is based on the granularity of fault detection and isolation that is desired, taken in consideration with the level at which recovery can be implemented. To further enhance the operation of the probe, it is made self testing against any single failure in its operational components. The technique to make the probe self testing uses the probe paradigm to define a null probe which tests the probe dispatcher and creates a null failure which in turn tests the probe analyzer. The probe concept according to the invention is applicable to both single and multiple system environments.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram of a transaction processing system of the type on which the probe system according to the invention may be implemented;

FIGS. 1A-1D show details of the block diagram of FIG. 1.

FIG. 3 is a block diagram of the probe system according to the invention which is incorporated into a main frame computer;

FIG. 4 is a table illustrating the content of the probe result buffer shown in FIG. 3;

DETAILED DESCRIPTION OF THE PREFERRED EMBODIMENTS OF THE INVENTION

Transaction processing systems are on-line, application-oriented systems typically implemented on a multiprocessor data processing system supporting a plurality of terminals, often distributed over a large geographical area. A typical transaction processing system is IBM's ACP (for Airline Control Program) which, although classically used in airlines reservations systems, has been used in other systems, notably by banks in on-line teller applications.

Figure 1C:
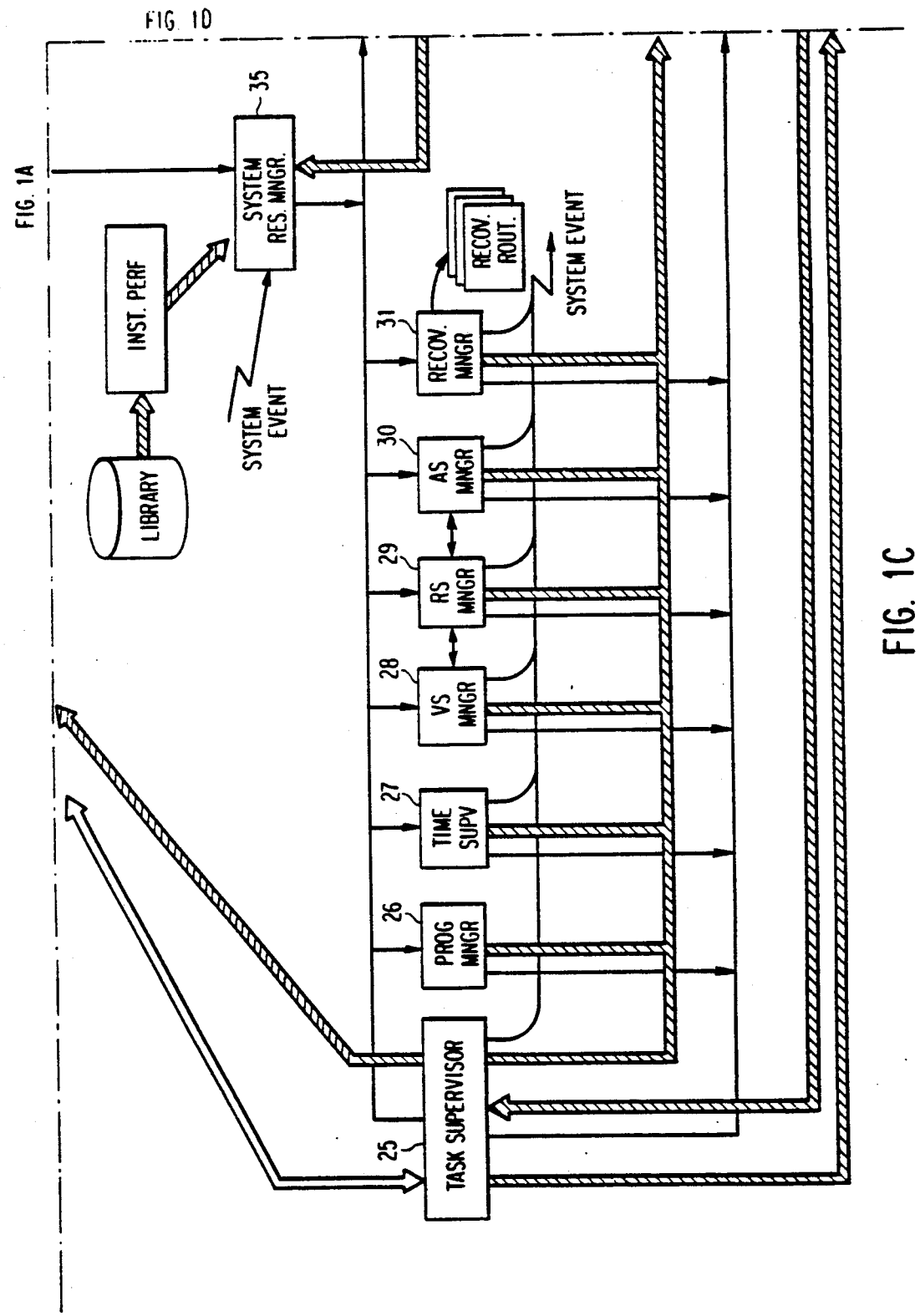
Figure 1D:
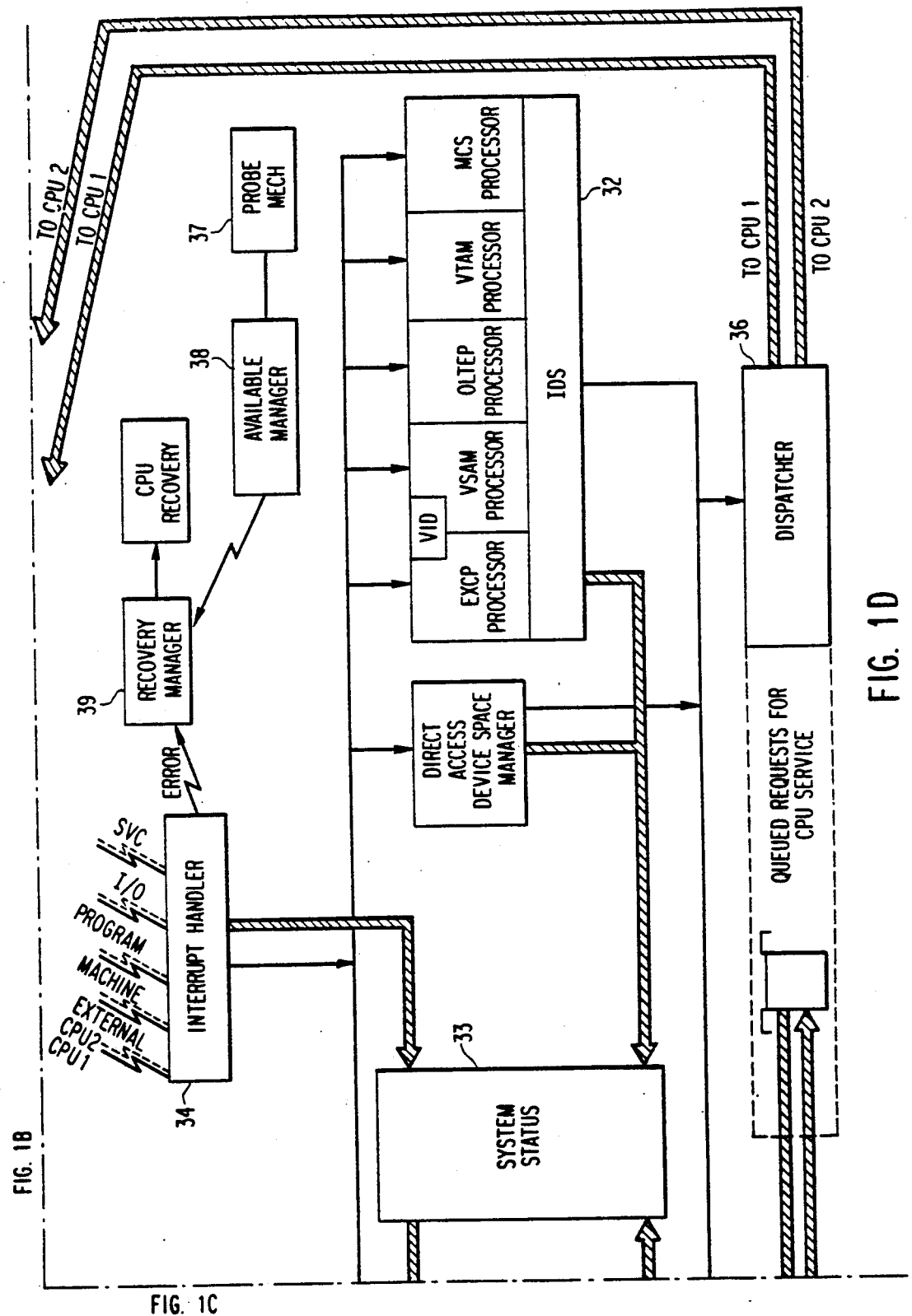

An example of a transaction processing system is illustrated in FIG. 1 of the drawings, to which reference is now made. The system includes one or more main frame computers 11 having a Virtual Terminal Access Method (VTAM) 12 and a Job Entry System (JES) 13 installed thereon. The VTAM 12 communicates with direct access storage devices (DASDs) 15 on which database and program libraries are stored. On-line users of the system access data via a plurality of local terminals 16 and remote terminals 17. The Job Entry System (JES) 13 communicates with both local job input/output (I/0) devices 18 and remote job I/0 devices 19.

Both the VTAM 12 and the JES 13 communicate with a base operating system, also installed on the computer 11. The operating system includes a master scheduler 21 which shares system resources among a central console 22 and one or more functional consoles 23 and the JES 13. The JES 13 generates a job queue which is input to a job scheduler 24, also part of the operating system, and this queue is input to the VTAM 12.

The operating system may be, for example, IBM's Multiple Virtual Storage (MVS) operating system. The MVS operating system also includes, among others, a task supervisor 25, a program manager 26, a timer supervisor 27, a virtual storage manager 28, a real storage manager 29, an auxiliary (or page) storage manager 30, a recovery termination manager 31, and an input/output system (IOS) function 32. All these communicate with a system status function 33 which receives inputs from various interrupt handlers 34 and provides an output to a system resources manager 35. In addition, the task supervisor 25 communicates with both the job scheduler 24 and a dispatcher 36. The dispatcher 36 has queued requests for central processor unit (CPU) service. This is but a very general overview of the MVS operating system and, for more information on the MVS operating system, reference may be had to *Operating Systems*, by H. Lorin and H. M. Deitel, Addison-Wesley (1981), and Chapter 21 of *An Introduction to Operating Systems*, by H. M. Deitel, Addison-Wesley (1984).

High performance transaction processing systems are increasingly used by large organizations. In a typical large installation, thousands of transaction types may be defined, although only a few hundred of them are frequently used. The arrival rate of the commonly used transaction types may fluctuate for various reasons; e.g., seasonally, specific hours of the day, or even randomly. In addition, computers of the system may be added or taken away, or fail. Other applications (program development, other interactive users) may at times demand a bigger share of the system machines.

Figure 2A:
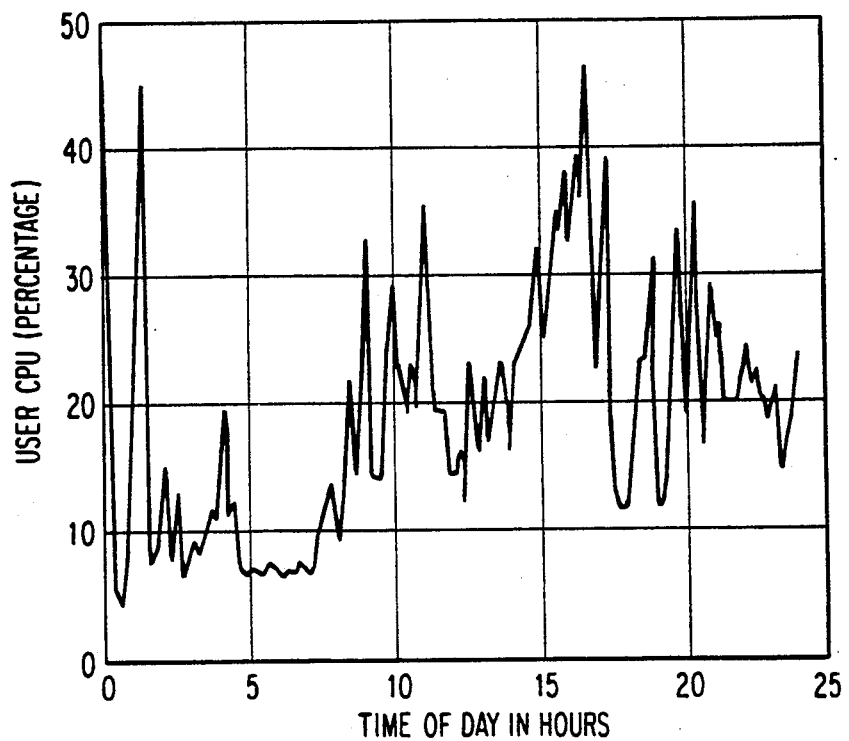
FIGS. 2A and 2B respectively show a latency profile and a work load profile from a production system such as the one shown in FIG. 1.
Figure 2B:
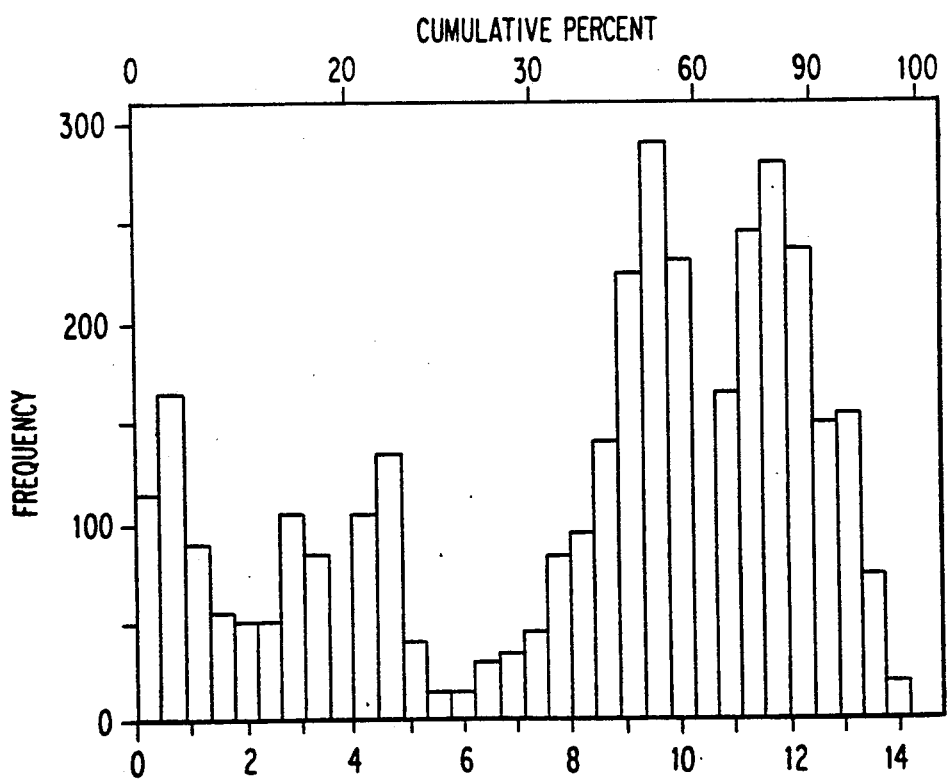

Failure rates also fluctuate. This has been measured empirically for various systems, as reported for example by Chillarege and Iyer in "Measurement-Based analysis of Error Latency", supra. FIG. 2A graphically illustrates one workload schedule of a central processor unit (CPU) by time of day. Notice that the system has a low workload from midnight to 7 a.m., except for a short peak at 1 a.m. and an increasing workload from 8 to 10 a.m., with a peak around 11 a.m. FIG. 2B shows the latency distribution of the detected errors, generated with faults inserted at midnight. The distribution has two distinct modes, with the second being the larger of the two. The initial peak is due to a combined effect of an initial discovery and due to the fact that there is a workload peak in the early hours of the morning. Within the first hour, ten percent of the errors are detected. The bulk of the errors, around seventy percent, are detected in the second mode. There is a sharp increase in the number of errors being detected about eight hours after the initial fault.

Although the distributions represented in FIGS. 2A and 2B are of a specific day, data from a number of days have show a similar pattern. It was found that no matter how low the workload when the fault occurs, there is always an initial discovery of faults that contributes to a small mode in the latency distribution. But if the fault occurred at a time during a high workload, then the initial discovery mode is dominated by the large discovery.

The errors may be caused by the interaction of multiple software modules and timing problems. Moreover, software failures in large transaction systems typically have large latencies ranging from a few hours to a few days. Thus, a failure may occur but not be manifest in the system until sometime later when that particular module is called to perform a particular service. In addition, the module itself may not exhibit a failure unless it interacts with a particular other module in the system.

The present invention provides a software probe which is capable of detecting and revealing failed software modules. The probe 37 communicates with an availability manager 38 which, like the interrupt handlers 34 shown in FIG. 1, provides a detected error output to a recovery manager support function 39. The process of a probe on a target proceeds according to the following logic. First, the probe requests a certain service from the target. If the service is rendered in a timely fashion, then it is inferred that the target is healthy and, if not, it is inferred as failed. Alternatively, the probe requests a change in the level (either an increase or a decrease) of service currently being provided by the target. If the target changes the level of service corresponding to the request, then it is considered healthy. If there is no change or the change does not correspond to the request, the target is labeled as failed.

In most cases, an exhaustive test of function is not necessary to reveal failed services. An exhaustive test becomes redundant and also resource consuming. A check on the primary functions is adequate to reveal a failed target, thus providing a fast and efficient failure detection mechanism. A probe is specific to a target and contains all the necessary information to request service and check the rendered service against a nominal index. Clearly, a set of probes is necessary to check on an entire subsystem; however, the concept lends itself very well to a hierarchical organization of targets. When the probe labels a target as failed, it could be due to one or more modules and/or functions that make up the target. Further isolation of the failure to the specific function within the target may be pursued using additional probes.

The operation of a system with probes can be viewed as partitioned into two operational components that communicate with each other. FIG. 3 shows this organization. The probe dispatch component 40 dispatches probes and records the inference on the target's health in a probe result buffer (PRB). This component includes a probe dispatcher 42 which accesses a probe library 44 in response to a queue 45 of probe requests. The dispatched probes are active probes 46 until a result is returned from their respective targets or until a predetermined time has elapsed. The results of the active probes are posted in the probe result buffer 48.

The other component of the probe system is the probe analyzer component 50. The probe analyzer component includes a probe analyzer 52 which analyzes the results in the probe result buffer 48 to infer the health of the overall system. The analyzer 52 is, in turn, driven by a periodic check list 54 of the probes to be performed. In addition, the analyzer 52 receives as an input a model of the services 56 the software modules are expected to perform. This model is used by the analyzer 52 to evaluate the results in the probe result buffer 48. Based on the analyses performed, the analyzer provides an output to the availability manager 38 to indicate the failure of software services.

In operation, a probe is initiated by the analyzer 52 by queuing a request in queue 45 to the dispatcher 42. The dispatcher 42 starts the probe and makes an entry in the probe result buffer 48, as shown in more detail in FIG. 4. This entry contains a probe-id (probe identification), a unique sequence number, a time stamp and the maximum time allowed for the probe to return with an inference.

This record is completed by the probe by labeling the target as healthy or as failed. The dispatcher 42 periodically inspects the probe result buffer 48 to check if the probes that were dispatched updated their respective status fields. If a probe does not return within the maximum time for the probe, the dispatcher 42 writes a lost field in the record. The probe could return late and update the status even though it has been marked lost. However, the sequence of events will be visible to the probe analyzer 52 since each update to the probe result buffer 48 leaves a time-stamp. A lost probe indicates a failed probe or a failed target. Lost probes can be further differentiated by the analyzer 52.

The probe analyzer 52 drives the probe dispatcher 42 from a periodic checklist and uses the probe result buffer 48 to determine failed services. Since the analyzer 52 is the component that drives the dispatcher 42, it has the capability to explore related targets that may be affected due to a failure and determine the extent of damage. This is an important ability which will help guide the recovery process with the help of an availability manager. This enhanced ability of an analyzer needs logic that can be based on some model of the system. Such a model should contain a set of dependencies of services with associated targets and their probe-ids. The degree of detail in such models is dependent on the recovery capabilities that are available through the availability manager 38.

Figure 5A:
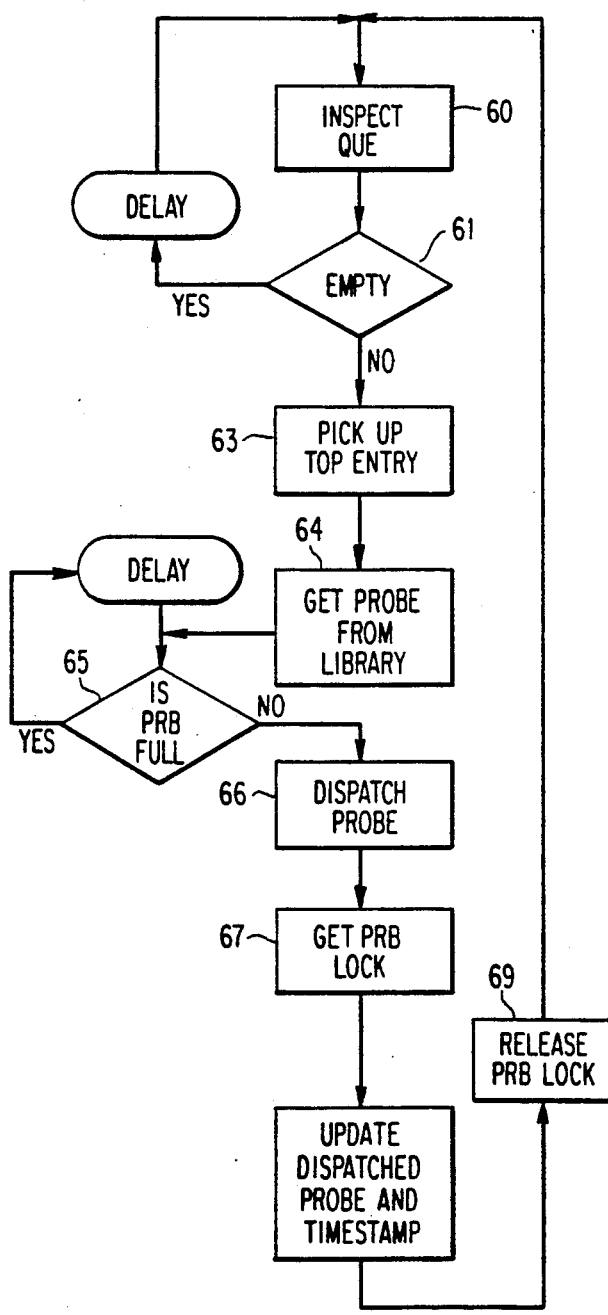
FIGS. 5A and 5B, taken together, are a flow chart showing the logic of the probe dispatcher shown in FIG. 3.
Figure 5B:
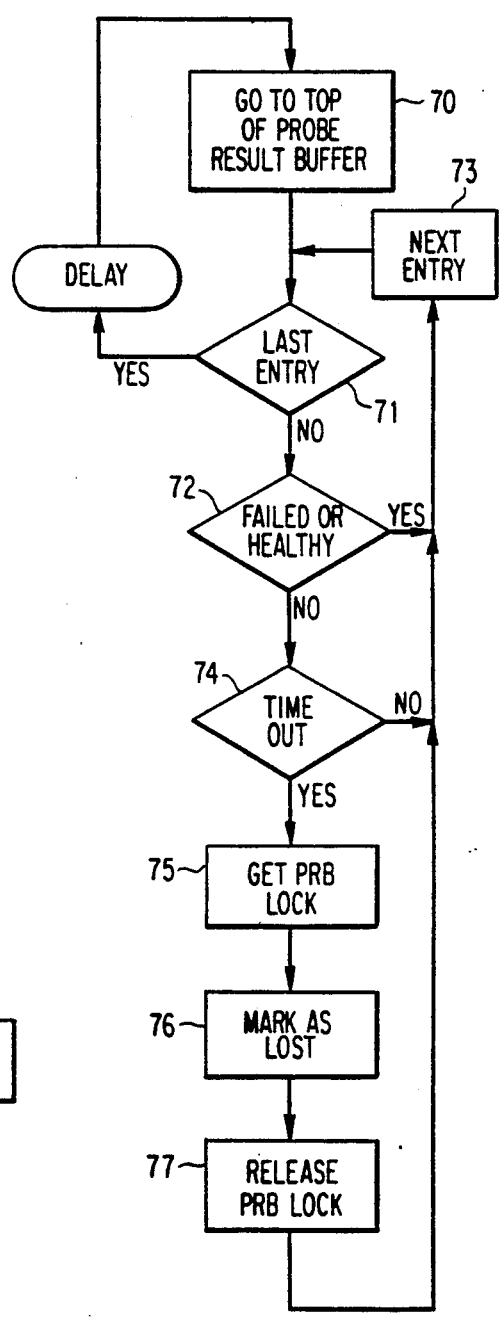

FIGS. 5A and 5B are flow charts illustrating the dispatcher logic. The dispatcher logic performs two functions, that of dispatching probes in response to probe requests in the queue 45 and that of managing the data entries into the probe result buffer 48. These two functions are represented by two threads. The first thread, shown in FIG. 5A, illustrates the function of dispatching probes and begins at function block 60 by inspecting the queue 45. A test is made in decision block 61 to determine if the queue is empty and, if it is, the process loops back, with a delay, to await a probe request in the queue. When the queue is not empty, the usual case, the top entry is picked up in function block 63. Based on the specific probe request, a probe is retrieved from the probe library 44 in function block 64. A test is made in decision block 65 to determine if the probe is full. If so, the process loops back, with a delay; otherwise, the retrieved probe is dispatched in function block 66. Before updating the probe result buffer (PRB) 48, a lock is acquired in function block 67, since the buffer is shared by more than one thread. The status of the dispatched probe is updated and provided with a time stamp in function block 68, this information being needed for maintaining the probe result buffer 48. The probe lock is released in function block 69 before control is returned to block 60.

The second thread, having to do with managing the data entries in the probe result buffer, is shown in FIG. 5B and begins by accessing top of the buffer 48 in function block 70. A test is then made in decision block 71 to determine if the top entry in the buffer was the last entry and, if it was, the process loops back, with a delay, before again attempting to process entries in the buffer. Assuming that the top entry was not the last entry, then a further test is made in decision block 72 to determine if the entry has the status of either healthy or failed. See FIG. 4 for examples of such entries. If the entry has the status of either healthy or failed, then the next entry is accessed in function block 73, and the tests of decision blocks 71 and 72 are repeated. If the entry does not have the status of healthy or failed, a test is made in decision block 74 to determine if the time has passed for receiving a response to the dispatched probe. If not, the process accesses the next entry via function block 73; otherwise, a probe lock is obtained in function block 76. After the lock is granted, the entry is marked as lost in function block 76 and the lock released in function block 77 before the next entry is accessed in function block 73. The status of lost is indicated for one of the entries of the probe result buffer 48 in FIG. 4. A lost probe indicates either a failed probe or a failed target, and this is differentiated by the probe analyzer 52.

Figure 6A:
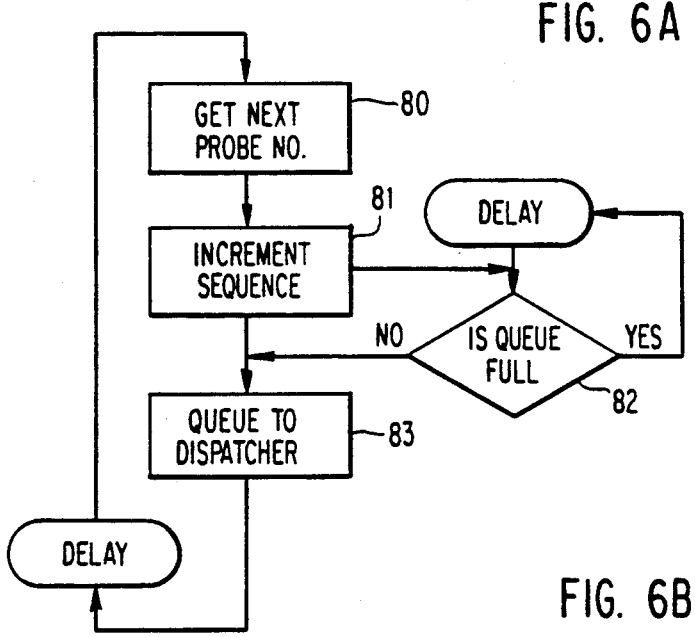
FIGS. 6A and 6B, taken together, are a flow chart showing the logic of the probe analyzer shown in FIG. 3.

The analyzer 52, like the dispatcher 42, has two threads. The first, and simplest, is loading the probe queue 45 to initiate the dispatch of specific software probes. The second thread analyzes the data entered into the probe result buffer 48 as a result of the probes. FIG. 6A illustrates the first thread, and FIG. 6A, the second. The process begins at function block 80 by accessing the next probe request from the periodic check list 54. The accessed probe is given a sequence number in function block 81. A test is made in decision block 82 to determine if the queue is full. If so, the process loops back, with a delay; otherwise, the sequence number is entered into the probe result buffer 48 by the probe dispatcher 42, and this number is used by the probe analyzer 52 to indicate the precedence of the probe. The probe request is then queued in the probe request queue 45 at function block 83. At this point, the process loops back, with a delay, to access the next probe request.

Figure 6B:
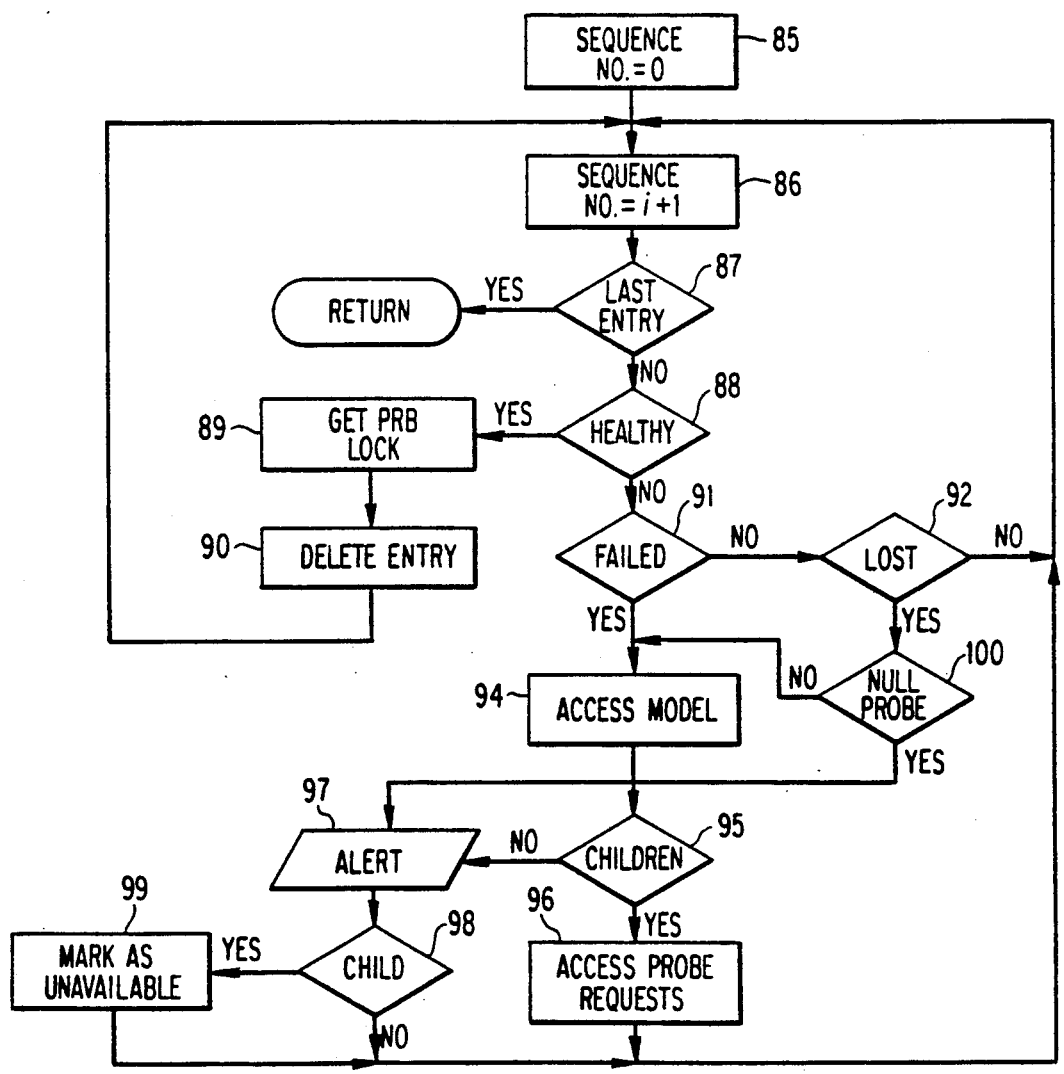

Referring now to FIG. 6B, the process of accessing and processing data entries in the probe result buffer begins by initializing the index number to zero in function block 85 followed, in function block 86, by incrementing the index number. A test is then made in decision block 87 to determine if the last entry has been processed. If so, a return to the main program shown in FIG. 6A is made; otherwise, a further test is made in decision block 88 to determine if the entry has the status of healthy. A healthy status is entered whenever the software module called by the probe returns the expected result within an expected time period. If the status is healthy, the analyzer requests a probe lock in function block 89, and when the lock is granted, the entry is deleted from the probe buffer 48 in function block 90. The process then loops back to function block 86 where the index number is incremented to access the next entry in the buffer 48.

If the status of the entry is not healthy, a further test is made in decision block 91 to determine if the status of the entry is failed. If not, an additional test is made in decision block 92 to determine if the status is lost. If not lost, the process loops back to function block 86 where the index number is again incremented to access the next entry.

Figure 7:
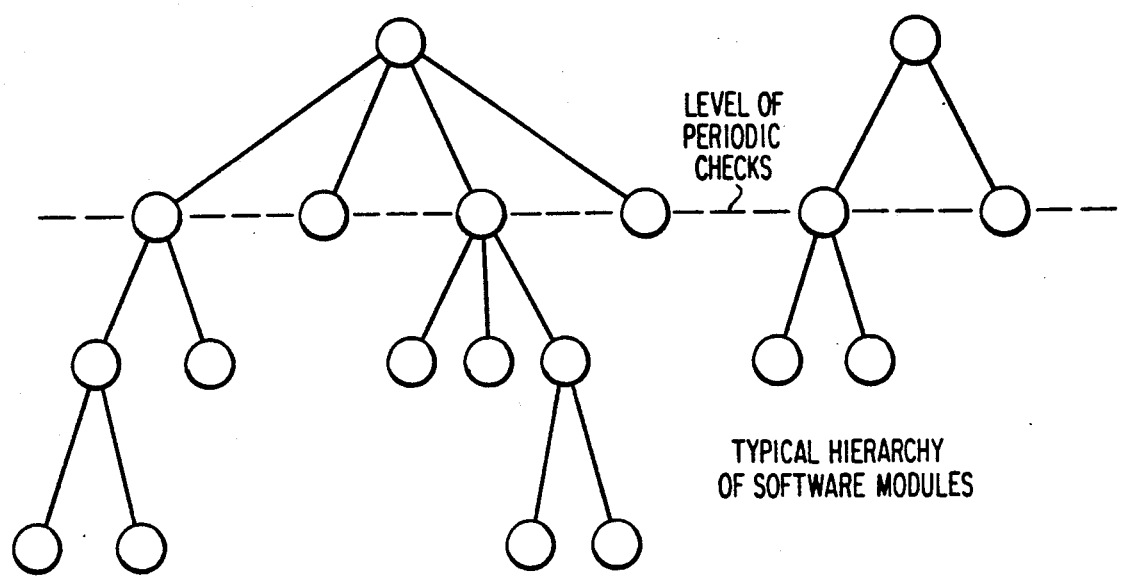
FIG. 7 is a diagram of a tree structure showing the process of the analyzer logic in determining the extent of a failed target and alternate paths.

If the status of the entry is failed, the model of the service for that probe is accessed from the model of services library 56 in function block 94 to determine if the target of the probe has any children. This is illustrated in FIG. 7 to which reference is now made. In FIG. 7 there is illustrated a hierarchical tree structure in which each node is a target. Only the level of nodes indicated by the dotted line is subject to the periodic checks stored in check lists 54. If one of those nodes (i.e., target) fails, then the analyzer 50 looks for children of that node. If children are found, these are marked for probe requests. The analysis process continues with probe requests added to the probe queue 45 and posted to the buffer 48 until nodes with no children are reached. In this way, the specific node which has failed can be identified. This identification is useful for diagnostic purposes, but it can also be used by the analyzer to mark a particular module as being unavailable. In this way, the availability of the system is maintained, although with degraded performance for some functions.

Returning to FIG. 6B, the failed node is tested for children in decision block 95, and if there are children, the probe analyzer 52 accesses probe requests for each of the children in function block 95 before the process returns to the main program shown in FIG. 6A. If there are no children, the probe analyzer provides an alert output in I/0 box 97. A further test is made in decision block 98 to determine if the failed module is itself a child of a higher level module either at or below the dotted line in FIG. 7. If so, an output is made to the availability manager in function block 99 which marks the module as being unavailable but allows processing of other children of the higher level module which have not failed. If not a child or after posting to the availability manager, the process loops back to function block 86 to access the next entry in buffer 48.

Returning now to decision block 92, if the status of the probe is lost, a further test is made in decision block 100 to determine if the probe was a null probe. If not, control goes to function block 94 for processing as if the status were failed. On the other hand, if the probe was a null probe, then the process goes directly to alert operation block 97.

The idea of a null probe is to test the probe itself. Thus, a null probe request is queued periodically. Since this probe is not directed to a specific software module, it will be "lost", and a posting to that effect should be made in the probe result buffer. One such null probe entry is shown in FIG. 4.

The probe concept provides a fast and efficient failure detection mechanism for software functions, modules and/or subsystems. The probe is enhanced to make the probe system self testing against any single failure in the operational components. The technique to make it self-testing uses the probe paradigm to define a null probe which tests the probe dispatcher and creates a null failure which in turn tests the probe analyzer. This is then used to make the probe system self-testing against any single failure in its operational components.

The purpose of the null probe is to test the probe dispatcher 42 as the target using the probe paradigm. This is accomplished very effectively by having a probe that has no target which also does not return a health status to the probe result buffer. The effect of requesting a null probe by the analyzer 52 is that the probe dispatcher 42 treats it as any other probe and performs the function of dispatching it an making an entry in the probe result buffer 48. However, the null probe by definition does not return any status. This will cause a lost status to be posted by the dispatcher 42 in the probe result buffer 48 after the maximum time for the probe elapses.

Essentially, the null probe has thus requested service from the probe dispatcher 42 and exercised all of its functions. The probe has also caused an entry in the probe result buffer 48, made by the dispatcher 42, which is a signature indicating that the dispatcher is healthy. The difference is that since the null probe is not expected to return with a status, minimal function external to the probe system is required to test the probe system.

Since a lost status is posted against the null probe, a failure is perceived by the probe analyzer 52. However, this actually does not represent a failure but in fact indicates a healthy probe dispatcher 42 and is therefore termed a null failure. The null failure in turn causes the analyzer 52 to react as it would to any failure. This may involve communicating the null failure to an availability manager or other similar alerts. Thus, the null probe, by causing a null failure, tests that function of the analyzer which inspects the probe result buffer 48 and raises alerts.

From the above discussion on the null probe, it is clear that, once a null probe is requested by the analyzer 52, it tests the probe dispatcher 42 and partially the analyzer function. It is expected that implementations of a probe system would typically have the analyzer generate probe requests from the checklist 54 periodically, which checklist includes a null probe. Then, a healthy probe system should report a null failure on the average every N probes. Now, that part of the analyzer 52 which generates probe requests from a check list 54 is tested since null probes are expected at regular intervals. This then completely tests the analyzer function. Thus, a self-testing probe system need only incorporate a null probe in the periodic checklist 54 of the analyzer 52. This will result in a null failure being reported at regular intervals indicating a healthy probe system.

The probe result buffer 48 of a healthy probe system, using the self-testing scheme, should contain null probe entries that have a lost status, on the average, every N entries. Thus, any observer (other than the availability manager who receives the failure alerts) can infer that most of the probe system (all except for the alerting function of the analyzer) is healthy. This is useful in a multiple machine configuration where each machine can have its own probe system.

The following examples illustrate the basic concept of the probe. Consider first a telecommunications subsystem which is part of a transaction system. In fault injection experiments on IBM's Information Management System/Virtual Storage (IMS/VS) product (a database/data communication system capable of managing complex databases and networks), it has been shown that there exist failure modes in the telecommunications system where the failure does not affect either the IMS application nor alert the operator. However, the fault does not permit any new terminal sessions to be set up. A probe that exercises the communication subsystem function of session management will detect and isolate the failure.

Next, consider the use of the null probe where the dispatching queue 45 as the target. Suppose that probes issue jobs with different priorities. If the dispatching queue is broken such that the dispatcher 42 never gets to see jobs below a point in the fracture, then only certain probe requests are satisfied and some are lost which will be detected by the analyzer 52. Further, the probe history log contains enough information for the analyzer 52 to identify the possible point of discontinuity in the dispatching queue 45.

Figure 8:
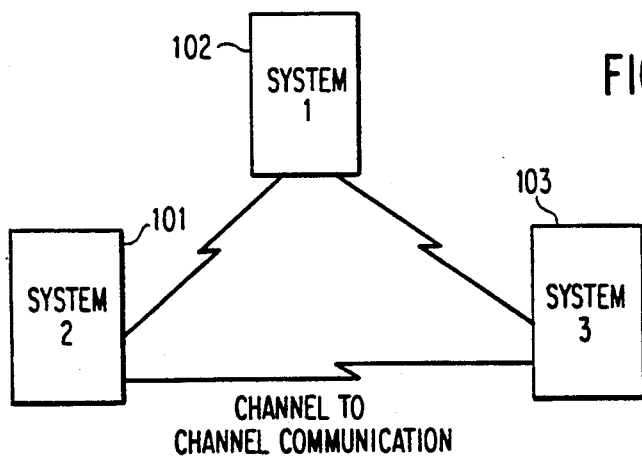
FIG. 8 is a simplified block diagram showing a multi-system environment in which a plurality of systems are connected via high speed communication links.
Figure 9:
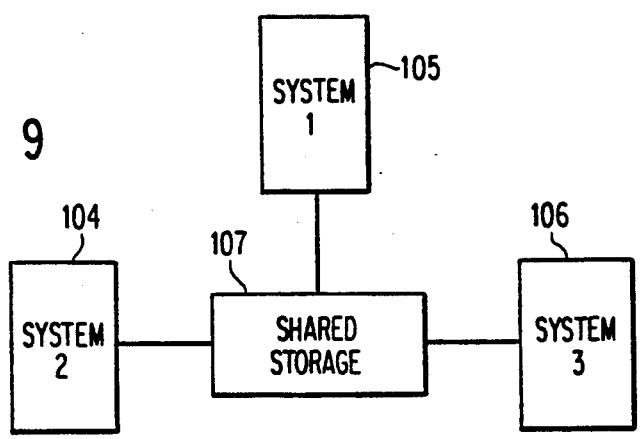
FIG. 9 is a simplified block diagram showing a multi-system environment wherein each of the systems share a common storage.

The probe according to the invention is applicable in a multiple system as well as a single system environment. A multi-system usually consists of several systems (possibly main frames) connected together through high-speed communication links and/or shared storage. FIGS. 8 and 9 show two typical multi-system configurations. In FIG. 8, there are illustratively three systems 101, 102 and 103 connected to each other via high speed communication links but do not share a common storage. In FIG. 9, the systems 104, 105 and 106 share common storage 107. Multi-systems can be built with a combination of shared storage and communication links.

In a multi-system, each system runs an image of the operating system, with additional services to provide for communication between the connected systems. Such communication primitives provide program-to-program communication, messaging and queuing services. Multi-system environments of the type described are generally well known and, therefore, for the purposes of this disclosure, it is assumed that messaging and queuing services are provided. Furthermore, for the implementation of the probe system in a multi-system environment, shared storage is not necessary. If it exists, it can be used to increase the performance of the operation of the probe.

The multi-system implementation provides for detection of failures of one system by another, in addition to the failure detection provided on each system. Essentially, a probe system is implemented in each system with slight modifications. Each of these probe systems can communicate with other probe systems across the multi-system using the messaging services provided in the multi-system environment. Hooks into the multi-system messaging are provided through modifications in the analyzer and consequently the analyzer logic. To support probe requests from other systems, a slight modification is also made in the probe result buffer table. These changes are shown in FIGS. 10 and 11.

Figures 10, 11:
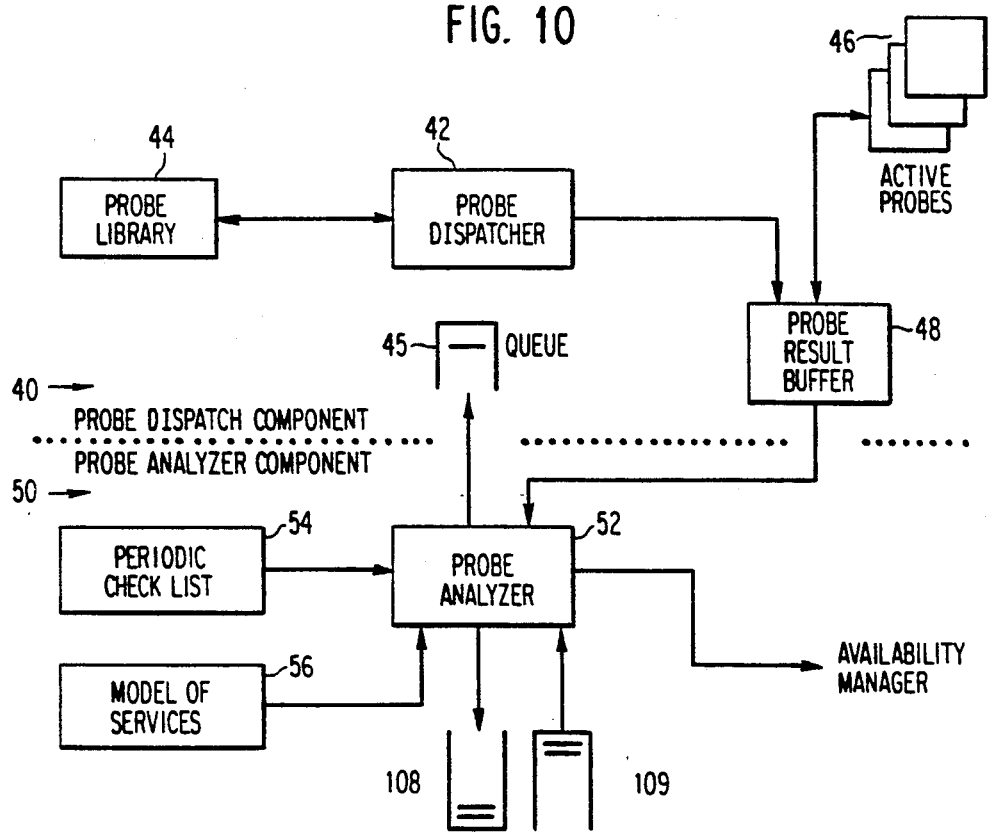
FIG. 10 is a block diagram, similar to FIG. 3, showing the probe system according to the invention which is modified for a multi-system environment.
FIG. 11 is a table illustrating the content of the probe result buffer shown in FIG. 10.

FIG. 10 is similar to FIG. 3 and shows a messaging interface from the probe analyzer to the multi-system services provided in the multi-system environment. FIG. 11 is similar to FIG. 4 and shows another field in the probe result buffer to show the system-id of the remote system; i.e., the one remotely requesting the probe. In a system of the type shown in FIG. 9 with shared storage, there can be a performance improvement by maintaining the probe result buffers in shared storage. This has the advantage that the probe result buffers for each system are visible to all systems. Thus, a remote system does not have to wait for messages to see how a probe is doing but may, instead, just look into a remote probe result buffer in the shared storage. This can be used to increase the performance of the probe system; however, it is important to note that the probe semantically works correctly under the description of the messaging paradigm of the system shown in FIG. 8.

In operation in a multi-system environment as shown in FIG. 10, a probe to a remote machine or system is dispatched by the analyzer 52 by sending it through the messaging system out-message-queue 108 and providing the probe-id and the destination; i.e., system-id and a return system-id. Similarly, a probe request from a remote machine or system is received by the analyzer 52 in the in-message-queue 109.

In-bound probe requests received by an analyzer 52 can be handled either asynchronously or periodically. This is a common practice in the art and implementation is usually decided by the designer depending on the number of systems in the multi-system. If there are only a few system, the analyzer 52 can be initiated asynchronously by the operating system when messages arrive. However, if there are many systems, it is often more efficient to initiate the analyzer 52 periodically to check the in-message queue and dispatch probe requests. Since this is also common practice, the method of initiation of the analyzer on remote probe requests need not be described. Thus, for the purposes of this disclosure, it is assumed that the analyzer 52 is initiated and is handling a remote probe request.

A remote probe request has three parts; the probe-id, a destination-id and a source-id (return) Remote probes arise from the periodic check list or the model of services, and the only difference is that they have a remote system-id. When the analyzer 52 looks at the remote system-id, it recognizes that it should not be sent to the dispatcher but routed to the remote system. It then adds to the probe request its system-id (for return purposes) and puts it out on the out-message queue 108. Note that the responsibility of determining whether that service is healthy or failed is now passed to the remote system. Therefore, it is not necessary to maintain a record in its probe response buffer (PRB) 48 that the probe is dispatched on a remote system. The remote system will provide a healthy or failed reply.

Requests from remote systems to dispatch a probe locally are received on the in-message queue 109. Note that the only difference between this and a local probe is that the dispatcher makes an entry in the system-id column of the probe result buffer 48, as shown in FIG. 11.

The in-message queue 109 contains results from other probe analyzers. Effectively, the probe analyzer comes to know about a failed probe that it dispatched on another system. It then follows the same logic as it would for any failure; i.e., it communicates the failure to the availability manager.

The probe analyzer uses the same logic to deal with local or remote probes when it comes to the part of looking through the probe result buffer for the result of the probe. The only difference is that when a failure is identified, it does not communicate this to its availability manager. Instead, it sends the message to the other probe analyzer; i.e., the one in the system in which the failure is detected.

A null probe dispatched on a remote system provides a self test, not only for the other probe system, but also for the communications or messaging system that ties the two probe systems together. Thus, the null probe paradigm is extensible to the multi-system implementation wherein the complete system is self-testing. All that is required is that a remote null probe request be maintained in periodic check lists.

While the invention has been described in terms of preferred embodiments in single and multi-system environments, those skilled in the art will recognize that the invention can be practiced with modification within the spirit and scope of the appended claims.

Having thus described our invention, what we claim as new and desire to secure by Letters Patent is as follows:

1. A method of detecting failed software components in a running software system, said method being performed by a probe mechanism installed on a computer system on which said software system is running, said method comprising the steps of:
   requesting by said probe mechanism service, a certain level of service, or a change in the level of service from a target selected from a set of functions, modules and/or subsystems of said software system while said software is running on said computer system; and
   check by said probe mechanism for a response to the request from said running software system within a predetermined period of time to determine if said target is healthy or failed.

2. The method recited in claim 1 wherein if a response is received within said predetermined period of time, further comprising the step of labeling a target as either healthy or failed based on the result of said checking step.

3. The method recited in claim 2 wherein if a response is not received within said predetermined period of time, further comprising the step of labeling a target as lost.

4. A method of detecting failed software components in a running software system, said method being performed by a probe mechanism installed on a computer system on which said software system is running, wherein said probe mechanism includes a probe dispatcher running under the control of a probe analyzer, said method comprising the steps of:
   requesting service, a certain level of service, or a change in the level of service from a target selected from a set of functions, modules and/or subsystems of said running system;
   checking for a response to the request within a predetermined period of time;
   if a response is received within said predetermined period of time, labeling a target as either healthy or failed based on the result of said checking step;
   if a response is not received within said predetermined period of time, labeling a target as lost; and
   defining a null probe which returns a lost status and thereby tests the probe dispatcher by creating a null failure.

5. A method of detecting failed software components in a running software system, said method being performed by a probe mechanism installed on a computer system on which said software system is running comprising the steps of:
   requesting service, a certain level of service, or a change in the level of service from a target selected from a set of functions, modules and/or subsystems of said running system;
   checking for a response to the request within a predetermined period of time;
   if a response is received within said predetermined period of time, labeling a target as either healthy or failed based on the result of said checking step;
   if a response is not received within said predetermined period of time, labeling a target as lost;
   analyzing those targets labeled as failed to determine whether the failed targets have children in a hierarchical tree structure of software modules, and if so requesting service, or a certain level of service, from the children of the failed targets.

6. The method recited in claim 5 further comprising the steps of:
   generating an alert output for those failed targets having no children; and
   generating an availability output indicating which children of a failed target are healthy.

7. A method of detecting failed software components in a running software system, said method being performed by a probe mechanism installed on a computer system on which said software system is running, wherein said software system is running on a plurality of interconnected computer systems, said probe mechanism being installed on each of said computer systems and including for each installation a probe dispatcher running under the control of a probe analyzer, the method comprising the steps of:
   requesting service a certain level of service, or a change in the level or service by a probe dispatcher on one computer system from a target selected on another computer system;

transmitting by a probe analyzer on said one computer system the service requested by said probe dispatcher; and analyzing by said probe analyzer on said one computer system a response to said requested service by checking for a response to the request within a predetermined period of time, and if a response is received within said predetermined period time, labeling a target as either healthy or failed based on the result of said checking step, but if a response is not received within said predetermined period of time, labeling a target is lost.

8. The method recited in claim 7 wherein said method further comprises the step of defining a null probe which returns a lost status and thereby tests said probe dispatcher and communication links between said computer systems by creating a null failure.

9. A software probe mechanism for detecting failed software components in a software system running on a computer system comprising:

means for requesting service, a certain level of service, or a change in the level of service from a target selected from a set of functions, modules and/or subsystems of said software system while said software system is running on said computer system; and means for checking for a response to the request from said running software system within a predetermined period of time to determine if said target is healthy or failed.

10. The software probe mechanism recited in claim 9 further comprising means responsive to said checking means for labeling a target as either healthy or failed if a response is received within said predetermined period of time or as lost if no response is received within said predetermined period of time.

11. A software probe mechanism for detecting failed software components in a running software system, wherein said software system is running on a plurality of interconnected computer systems, said probe mechanism being installed on each of said computer systems and including for each installation a probe dispatcher running under the control of a probe analyzer, comprising for each said computer system:

means for requesting service, a certain level of service, or a change in the level of service from a target selected from a set of functions, modules and/or subsystems of said working system;

means for checking for a response to the request within a predetermined period of time;

means responsive to said checking means for labeling a target as either healthy or failed if a response is received within said predetermined period of time or as lost if no response is received within said predetermined period of time;

out-message means connected to said probe analyzer for receiving messages by said probe dispatcher on one computer system requesting service, or a certain level of service, from a target selected on another computer system; and in-message means connected to said probe analyzer for receiving a response to said requested service.

12. A software probe mechanism for detecting failed software components in a running software system comprising:

means for requesting service, a certain level of service, or a change in the level of service from a target selected from a set of functions, modules and/or subsystems of said working system;

means for checking for a response to the request within a predetermined period of time;

means responsive to said checking means for labeling a target at either healthy or failed if a response is received within said predetermined period of time or as lost if no response is received within said predetermined period of time;

means for analyzing those targets labeled as failed to determine whether the failed targets have children in a hierarchical tree structure of software modules; and means for requesting service, or a certain level of service, form the children of the failed targets.

13. A probe mechanism for periodically testing software components in a software system running on a transaction processing system comprising:

a probe dispatcher connected to access a probe request queue and, in response to a probe request, accessing a probe library, said probe dispatcher dispatching a probe accessed from said probe library to request service, or a certain level of service, from a target selected from a set of functions, modules and/or subsystems running on said transaction processing system;

a probe result buffer written to by said probe dispatcher and containing a list or probes dispatched and a time stamp of when each probe was dispatched, said dispatcher checking for a response to a request made by each probe and entering a status in said probe result buffer indicating the target as being either healthy or failed if a response is received within a predetermined period of time from said time stamp or lost if a response is not received within said predetermined period of time; and a probe analyzer connected to said probe request queue for loading said queue with probe requests and to said probe result buffer for analyzing targets having a status of failed or lost and providing an analysis output.

14. The probe mechanism recited in claim 13 further comprising:

a periodic check list accessed by said probe analyzer, said check list containing probe requests in a sequence and frequency for testing said transaction processing system; and a model of services accessed by said probe analyzer, said model of services providing information for analyzing failed targets.

* * * * *